United States Patent [19]
Anton et al.

[11] Patent Number: 5,995,974
[45] Date of Patent: Nov. 30, 1999

[54] DATABASE SERVER FOR HANDLING A PLURALITY OF USER DEFINED ROUTINES (UDRS) EXPRESSED IN A PLURALITY OF COMPUTER LANGUAGES

[75] Inventors: Jeffrey A. Anton, Oakland; Michael F. Schippling, Berkeley, both of Calif.

[73] Assignee: Informix Software, Inc., Menlo Park, Calif.

[21] Appl. No.: 08/921,934

[22] Filed: Aug. 27, 1997

[51] Int. Cl.$^6$ .................................................. G06F 15/163
[52] U.S. Cl. .............................. 707/103; 707/10; 707/4; 395/200.31; 395/200.52; 395/652; 395/683
[58] Field of Search .................................. 707/4, 10, 100, 707/103; 395/200.31, 200.47, 200.52, 705, 200.53, 652, 682, 683, 684

[56] References Cited

U.S. PATENT DOCUMENTS

| | | | |
|---|---|---|---|
| 5,257,366 | 10/1993 | Adair et al. | 395/600 |
| 5,442,779 | 8/1995 | Barber et al. | 395/600 |
| 5,450,583 | 9/1995 | Inada | 395/650 |
| 5,566,332 | 10/1996 | Adair et al. | 707/101 |
| 5,613,117 | 3/1997 | Davidson et al. | 395/708 |
| 5,680,618 | 10/1997 | Freund | 707/200 |
| 5,689,633 | 11/1997 | Cotner et al. | 395/182.14 |
| 5,765,179 | 6/1998 | Sumita et al. | 707/530 |
| 5,870,562 | 2/1999 | Butman et al. | 709/238 |

OTHER PUBLICATIONS

M.Stonebraker et al., "Extendability in Postgres," Dept.of El.Engineering and Computer Sciences, UC Berkeley, Bulletin of the Computer Society of the IEEE, vol. 10, No. 2, Jun. 1987, pp. 16–23.

D.Goldhirsch et al., "Extensibility in the PROBE Databese System," Computer Corporation of America, Cambridge, MA, Bulletin of the Computer Society of the IEEE, vol. 10, No. 2, Jun. 1987, pp. 24–31.

J.McPherson et al., "An Overview of Extensibility in Starburst," IBM Almaden Research Center San Jose, CA, Bulletin of the Computer Society of the IEEE, vol. 10, No. 2, Jun. 1987, pp. 32–39.

*Primary Examiner*—Jean R. Homere
*Attorney, Agent, or Firm*—Fish & Richardson P.C.

[57] ABSTRACT

User Defined Routines (UDRs), capable of being expressed in one or more languages, are handled by determining a language native to the UDR, for example, by looking up a system catalog. If a language manager associated with the native language has not been loaded already, the language manager is loaded into a server memory. If the UDR has not already been instantiated, the UDR is instantiated and initialized. Then an execution context for the UDR is created and the UDR is executed. Loading of the language manager is handled by a general language interface capable of initializing the language manager, loading the language manager, creating a language manager context, and executing the language manager.

12 Claims, 6 Drawing Sheets

| SYS_PROCEDURE | | | | |
|---|---|---|---|---|
| NO. OF ARGUMENTS | ARG. TYPES | RETURN TYPES | LANGUAGE | LANG. SPECIFIC |
| ... | ... | ... | JAVA | CLASS |
| ... | ... | ... | C | foo.SO |
| ... | ... | ... | SPC | ... |

DATABASE SERVER FOR HANDLING A PLURALITY OF USER DEFINED ROUTINES (UDRS) EXPRESSED IN A PLURALITY OF COMPUTER LANGUAGES

BACKGROUND

The present invention relates to a language manager for a database management system (DBMS).

The advent of powerful, yet economical computers has made these machines an integral part of many organizations. An important class of application for these computers includes a database, which is a body of information that is logically organized so that the information can be stored, searched and retrieved by a "database engine"—a collection of software methods for manipulating data in the database. The database allows users to perform operations such as locating, adding, deleting and updating records stored in the computer without a detailed knowledge of how the information making up the records is actually stored in the computer.

One powerful type of DBMS is known as a relational DBMS where stored information appears to the user as a set of tables, each of which is termed a "relation." In each relation, the information is arranged in rows and columns, with columns of data being related to each other by one or more predetermined functions. Further, each column has an attribute and each attribute has a domain which includes data values in that column. The structure of a relational database can be modified by selectively redefining relationships between the tables.

A database engine may perform complex searches on a relational database quickly and easily by using any of various database query protocols such as the method expressed by the Structured Query Language (SQL) or by other mechanisms. The relationships between the tables enable results of a search to be cross-referenced automatically with corresponding information in other tables in the database. A variety of operations made be performed on the tables in the database, including join, project and select operations. These operations may be made to standard as well as to user-defined data types.

To access a particular item of information in the relational DBMS, a query compiler converts a user request typically expressed in SQL into a set of operations to be performed on one or more input relations to yield a solution in response to the user request. Moreover, the user request may, under certain predetermined conditions, cause one or more user-defined routines (UDRs) to be executed. These UDRs may be implemented either as internal programs or external programs.

An internal program is a program that executes within the execution environment managed by the DBMS. The internal program typically is written in an interpreted language that is supported only within the DBMS environment. In contrast, an external program is capable of running in an environment managed by an operating system. External programs typically are expressed in a high level language which may be proprietary or may be a standard language such as Ada, Basic, C, C++, Cobol, Java, Pascal, or a fourth generation programming language, among others.

Although most relational database management systems support predefined procedures implemented as internal programs, not all systems support external programs. Moreover, in systems that support external programs, the language supported may be interpreted, as opposed to compiled, leading to suboptimal processing performance. Other systems hard-code their support of specific languages. These systems are inflexible in that a modification of an existing language or an addition of a new language is tedious.

SUMMARY

A computer-operated apparatus supports one or more User Defined Routines (UDRs) capable of being expressed in one or more languages. The apparatus first determines a language native to the UDR by looking up a system catalog. Next, the apparatus checks if a language manager associated with the native language already has been loaded and if not, the apparatus loads the language manager into a server memory. The apparatus then checks if the UDR already has been instantiated and if not, instantiates and initializes the UDR. The apparatus then creates an execution context for the UDR, after which the UDR is executed. The loading of the language manager is handled by a general language interface capable of initializing the language manager, loading the language manager, creating a language manager context, and executing the language manager.

Advantages of the invention may include one or more of the following. The system described here enables UDRs to be executed in a relational DBMS in a manner that is independent of the UDRs' implementation details. Moreover, a support facility for multiple languages is provided. A database language manager allows a particular language and its UDR support environment to be developed subsequent to a database engine development. Moreover, an alternative support environment can be developed for an existing language. Additionally, repairs can be made without replacing the server or code modules. The UDRs can be implemented in a number of languages. The support of multiple languages reduces the complexity in implementing the UDRs, as software can be coded to take advantage of specific strengths of specific languages. Further, language interpreters may be added or modified on demand on a running system. Similarly, UDRs may be added or modified on demand on a running system. These UDRs may perform arbitrary processing, including implementing new data types and operations for the database engine.

Other features and advantages will be apparent from the following description and the claims.

DESCRIPTION

Figure 1:
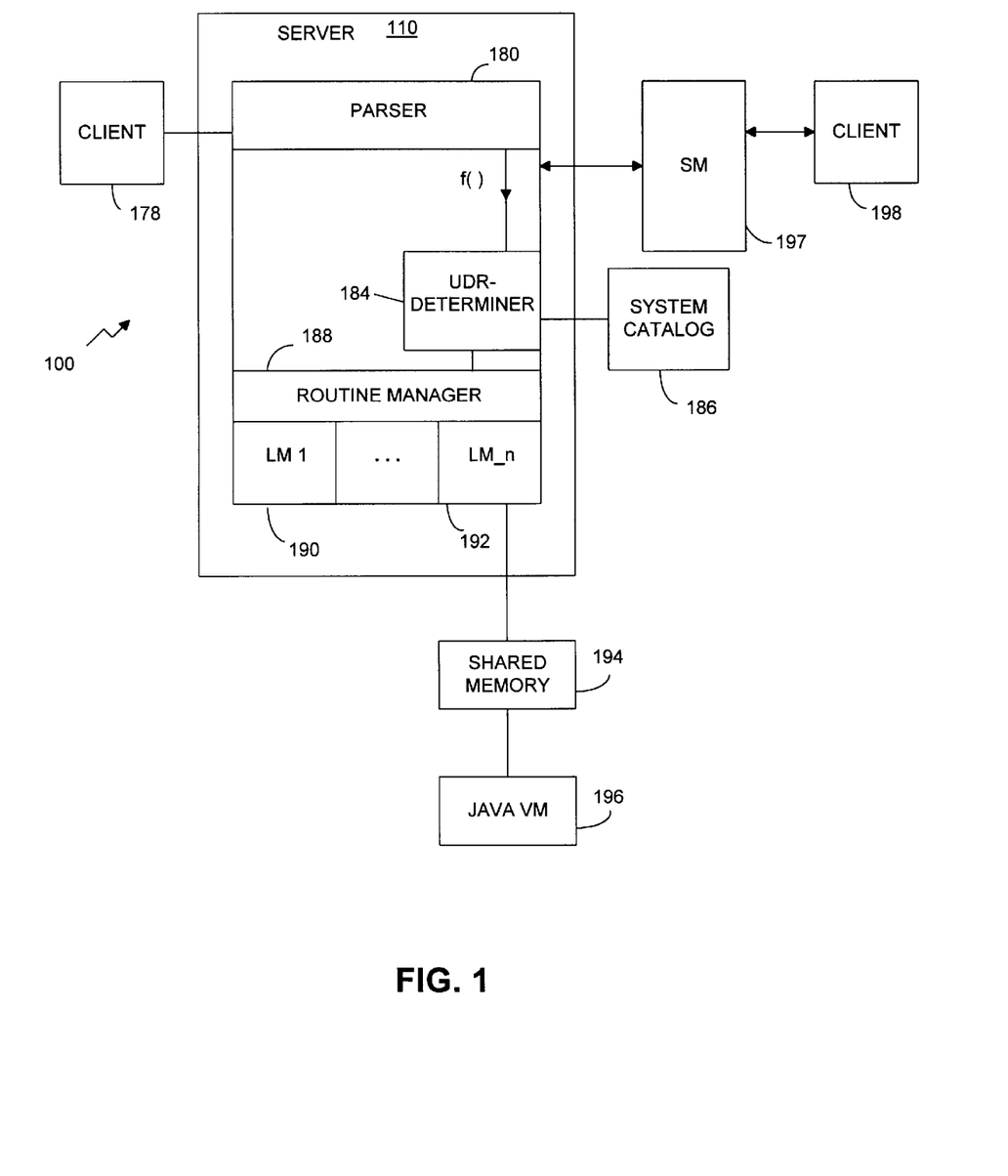
FIG. 1 is a block diagram of a server with a DBMS and one or more language managers.

Referring now to FIG. 1, a database server 110 having one or more language managers 190–192 is shown. A client 178 may communicate directly with the database server 110.

Alternatively, a client 198 may communicate with the server 110 using a shared memory (SM) 197. Requests from the client 178 are provided to a parser 180 for analyzing database instructions and functions. The parsed functions are provided to a user-defined routine (UDR) determiner 184. In response, the UDR determiner 184 looks-up the function in a system catalog 186 for more details on the parsed functions, including the language in which the function is written. After retrieving information about the function from the system catalog 186, the UDR determiner 184 passes this information to a routine manager 188. The routine manager 188 in turn is connected to one or more language managers (LMs) 190–192. Tasks performed by each LM 190–192 include: identifying a routine (function or procedure) using a unique descriptor containing static routine information, managing the loading and unloading of UDR modules in the server 110's memory, creating a data structure containing dynamic information necessary to execute an instance of the routine in the context of an SQL statement, and managing the actual execution of the UDR. The language managers 190–192 further provide language specific facilities so that the routine manager 188 needs only to invoke the appropriate language manager. Hence, if the language manager 192 manages a Java-related function calls, the language manager 192 may have a Java-specific exception system.

Languages managed by the routine manager may include C, Java, Cobol, Stored Procedure Language (SPL), among others. Each of the language managers 190–192 communicates with a language execution engine using a shared memory. For example, since the language manager 192 manages Java-related calls, the language manager 192 is connected to a shared memory (SM) 194, which in turn is accessible by a language-specific virtual machine, for example, Java virtual machine (VM) 196.

Upon receiving the parsed functions from the UDR determiner 184, the routine manager 188 determines whether the language manager supporting a particular parsed function has been loaded into the server 110's memory. If not, the routine manager 188 loads the required language manager into memory. Hence, the routine manager 188 loads language managers dynamically as necessary. Details relating to the invoked function are passed to the appropriate LM 190 or 192, which in turn determines whether the requested function has been loaded. The LM 190 or 192 thus provides facilities needed by the server 110 to load and execute UDRs.

Figure 2:
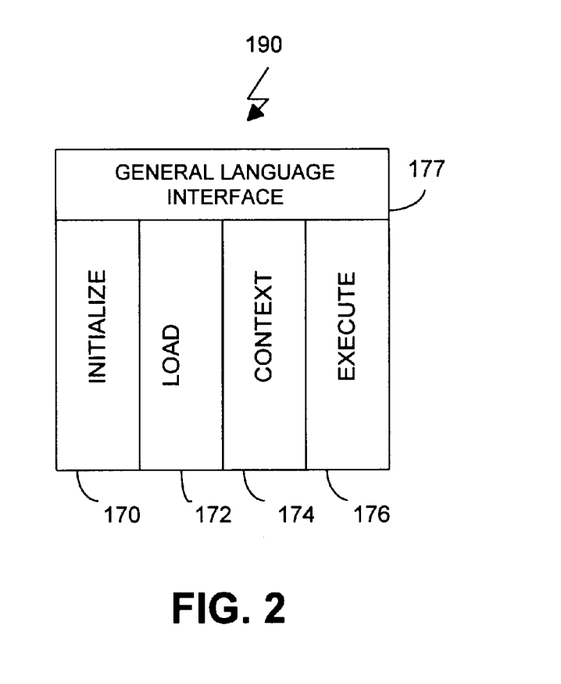
FIG. 2 is a schematic illustration of components for each language manager.

Referring now to FIG. 2, details on a representative language manager 190 (FIG. 1) are shown. The LM 190 has an initialization component 170, a load component 172, a context component 174 and an execute component 176.

The initialization component 170 sets variables to predetermined settings when the LM 190 is first invoked and loaded into memory. The load component 172 is made available to server processes to load UDR specific modules into memory. The load component 172 supplies a common interface to a set of language specific calls which variously install any code required by the specific language such as loading an interpreter, install code and/or data modules containing the specified routine, checks licenses for the modules being loaded, and unload modules and/or removes language specific codes from memory. The context component 174, which is made available to server processes to manage context for UDRs, supplies a common interface to a set of language specific calls that create and destroy state context instances for particular routines. The LM Execution component 176 is made available to server processes to implement the execution of a UDR. The execution component 176 supplies a common interface for general routine management and a set of language specific calls that set up, call, and return values from UDRs.

The LM 190 also has a general language interface component 177 which is a specification for a set of calls needed to implement a specific language interface. These calls are used by the load, context, and execution components 172–176 to perform their duties. The general language interface component 177 thus provides a common interface for language specific functions that (1) load and unload modules containing UDRs; (2) create and destroy the language context for each routine; and (3) marshal arguments, execute a routine, and return results.

In one implementation of the general language interface component 177, a suite of functions for each language is loaded from a C-callable module, which can be reloaded as required. A C Routine Interface is an instance of the General Language component for common C routines. It implements specific actions needed to call UDRs written in C from the server 110. The C Routine Interface provides functions necessary to load and unload a shared object code module; allocate and free a parameter structure for a routine; convert and push arguments onto a call stack, execute the routine, and return the routine's result.

In another implementation of the general language interface component 177 using a Stored Procedure Language (SPL), the SPL interface implements specific actions needed to call SP modules from the server. An SPL interface supplies functions to lock the procedure in the procedure cache during execution, convert and pass arguments, execute the Stored Procedure, and return the result.

Turning now to routines implementing the general language interface on the client side, a client side routine interface implements specific actions needed by the server to call the routines resident in the client code. The client routine interface supplies functions necessary to inform the client of the need for a particular routine and module to be executed. The client routine interface also converts and passes arguments to the client executing the routine, and returns results from the client.

The following data structures and function calls are prototypes of those used to create a specific language interface for the Language Manager. Descriptors created or used by these calls are maintained in linked lists by the higher level Language Manager functions, and may be subject to least recently used (LRU) caching. Every supported UDR language supplies an instance of each of these calls. The calls are loaded from a single shared object module. The initialization function name will be stored in a SYSROUTINELANGS system catalog table for each language.

| | |
|---|---|
| STATUS udrlm__XLANG__init ( <br>    udrlm__ldesc* Idesc) ;  // descriptor to fill <br>        in | Performs any language specific initialization. Is called once at the time of the first reference to this language. Will fill in the udrlm__ldesc function pointers and language specific field as needed. All memory should be allocated from a system wide pool. Returns FUNCSUCC on success. |
| STATUS udrLn__XLANG__shut ( <br>    udrlm__ldesc* Idesc);  // Language descriptor | Performs any language specific cleanup. Is called once at the time of the unloading of the last routine that references this language. Will free resources allocated at initialization time. Returns FUNCSUCC on success. |
| STATUS udrlm__XLANG__parse ( <br>    char* external__name,  // external name from user <br>    char* module,         //module name <br>    char* symbol) ;        //symbol name | Parses the given external__name string into a module name key value and a symbol name to be used by subsequent language functions. The module argument is set to the module name and any other information in the string is parsed into the symbol argument. If there is no module name, a unique string, e.g., "NULL", should be copied into external__name. If there is no extra information in the external__name string, the symbol argument is set to a null string. For safety, both arguments should be the size of full external name attribute of the SYS_PROCEDURES table. This function is used when initializing the udrlm__mdesc structure |
| STATUS udrlm__XLANG__load ( <br>    proccache__t*rdesc,    //routine descriptor <br>    udrlm__mdesc*mdesc ) ;  //module descriptor | Performs any language specific loading of the specified routine and module, e.g. linking shared objects and finding symbols. If the mdesc reference count field is zero, then the structure is not fully initialized and this is the first reference to the module specified in the rdesc. In this case this function will load the module and fill in the mdesc language specific field as needed. After the module is loaded this function will be called again with mdesc reference counts greater than zero. In these cases, the specific routine should be loaded and the rdesc language specific field filled in appropriately. (In the C language for example, the first call does a dlopen() and subsequent calls do dlsym()s to locate functions in the module). All memory should be allocated from a system wide pool. Returns FUNCSUCC on success. <br>Note 1: When external modules are being loaded, this function should take pains to insure the security and integrity of the system. For example in the C language, various schemes for monitoring file ownership and permissions should be implemented to prevent un-trusted modules from being installed |
| STATUS udrlm__XLANG__unload ( <br>    udrlm__mdesc* mdesc ) ;  // module descriptor | Performs any language specific unloading of the specified module, e.g., unlinking shared objects. Returns FUNCSUCC on success. |
| STATUS udrlm__XLANG__context__open ( <br>    proccache__t* rdesc, //routine descriptor <br>    udrlm__rinst** rinst) ;  //instance descriptor <br>           (ref) | This function will be called before the first execution of a User Routine in a statement (e.g., at the start of an SQL statement, or when a new late-bound routine is resolved) . If *rinst is NULL this function will allocate a new structure and any other memory needed by the language context for the UDR. Otherwise this is a previously allocated context structure that is being recycled from cache and will be initialized for the first use of the referenced Routine. Memory should be allocated from a session pool. Returns FUNCSUCC on success. <br>Note: This function allocates both common and language specific memory in order to minimize the |

| | |
|---|---|
| | number of allocation calls and reduce memory fragmentation. For instance, logically, everything but language state initialization should happen on a per-execution basis, but by moving all this to a per-instance function, significant overhead may be removed from most execution loops. |

| | |
|---|---|
| STATUS udrlm_XLANG_context_close ( udrlm_rinst* rinst) ; //Instance descriptor | Performs any language specific cleanup after the final use of the context structure. It will free the rinst structure and associated language specific resources. Will be called when cached descriptors are removed. Returns FUNCSUCC on success |
| STATUS udrlm_XLANG_execute ( udrlm_rinst* rinst,   //instance descriptor void* args,                //arguments void* rets) ;             //return values | Sets up and executes a routine using the arguments given. The rinst will be used to maintain state information through multiple calls to this routine. The return value(s) will be placed in the rots and the return state will be placed in the rinst on successful execution. The STATUS return indicates the result of the execution attempt, NOT the result of the UDR itself. |

| | |
|---|---|
| STATUS reload_module ( ModuleName,    //module to reinstall Language)         //language to use | This function may be called from SQL to reload a routine module. All executions of UDRs referencing this module while this function is operating will continue to use the old module until the end of the statement. If the module was not already installed it will be loaded for the first time. |
| STATUS replace_module ( OldModuleName,   //module to reinstall NewModuleName,   //new module to use Language)           //language to use | This function may be called from SQL to replace a routine module. All executions of UDRs referencing this module while this function is operating will continue to use the old module until the end of the statement. |

When the first routine using a specific language is invoked, the language interface itself is loaded and initialized following these steps:
1) a udrlm_ldesc structure is located or created for the language.
2) The row for the language is selected from a SYSROUTINELANGS catalog. If there is no row for this language an error is returned.
3) The row specified by a "langinitfunc" attribute of the SYSROUTINELANGS table specifies the language initialization routine in the SYS_PROCEDURES catalog.
4) a standard C language load module operation is performed:
   a udrlm_mdesc structure and a temporary udrlm_rdesc structure are initialized from the SYS_PROCEDURES table.
   The built-in C language udrlm_clang_load_module( ) function is called to load the language initialization interface module.
6) The udrlm_XLANG_init( ) function referenced in the langinitfunc attribute is called to initialize the udrlm_ldesc structure.

When the last reference to a UDR using a specific language is dropped, the language interface is shut down and removed. The steps that occur during the language drop are:
1) The language's udrlm_ldesc is removed from the language list to prevent new routines from using this language.
2) The udrlm_XLANG_shut( ) function is called to clean up resources.
3) The built-in C language udrlm_clang_unload_module( ) function is called to unload the language interface module.

If any routines that reference the language under consideration are invoked subsequently, and the language entries in the SYSROUTINELANGS and SYS_PROCEDURES catalog have not been DELETED, the specified language module will be reloaded and initialized. If the catalog entries are DELETED, subsequent function invocations will attempt to load the language, but an error will occur when the language is not found in the catalog.

Moreover, when all routines that reference a module have been dropped, the module will be removed as well.

The steps taken during a module DROP are:
1) The udrlm_unload( ) function is called for a routine.
2) If this is the last reference to the specific module it will be removed by calling the language's udrlm_XLANG_unload_module( ) function.
3) If this is the last reference to the language
   a. The udrlm_XLANG_shut( ) function is called.
   B. The udrlm_ldesc is freed.
   C. The built-in C language udrlm_clang_unload_module( ) function is called to unload the language interface module.
   D. The language module's udrlm_mdesc is freed.

Figure 3:
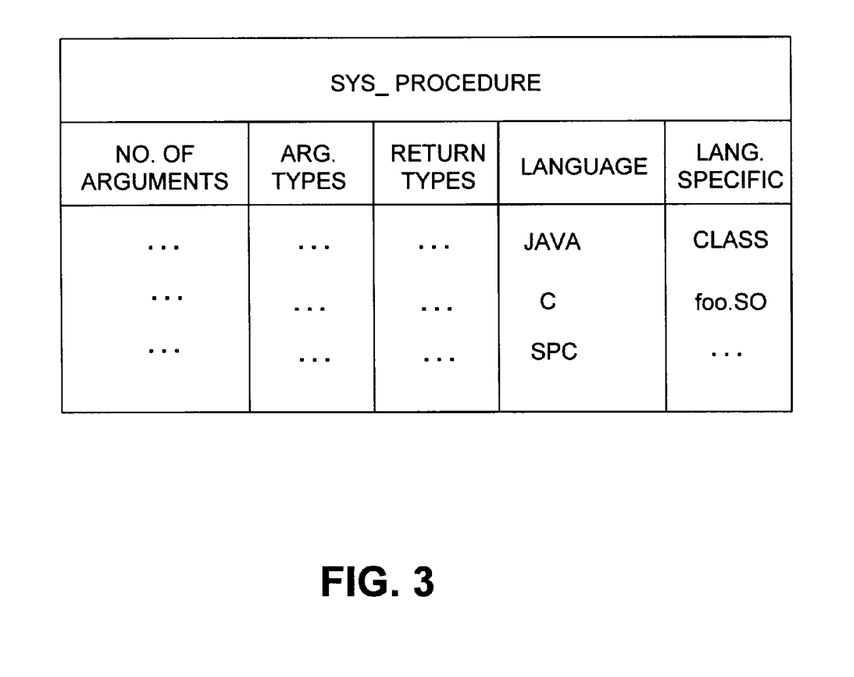
FIG. 3 illustrates a representative system procedure (SYS_PROCEDURE) catalog entry.

Turning now to FIG. 3, a representative system procedure (SYS_PROCEDURE) table is shown. The SYS_PROCEDURE table has a number of arguments, argument type column, return type column, language type column and language specific declaration column. Using the SYS_PROCEDURE table, the UDR determiner 184 can look-up specifics on the function being analyzed, including the language type, the number of arguments accepted, the type of arguments to return, and other language/routine specific information.

Figure 4:
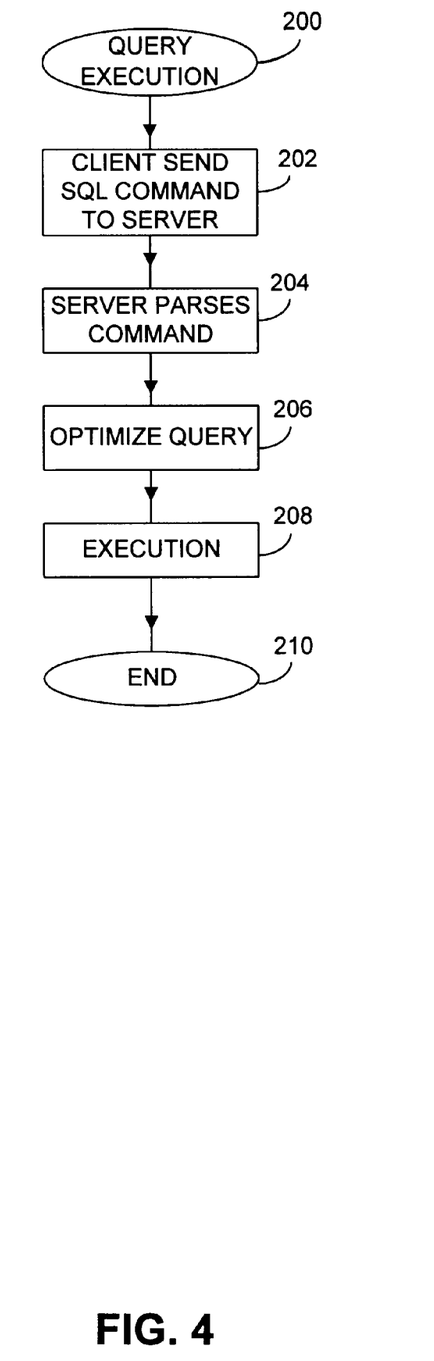
FIG. 4 is a flow chart illustrating a query execution process.

Referring now to FIG. 4, a query execution process 200 is illustrated. In the process 200, the client initially sends an SQL command to the server 110 (step 202). Next, the server 110 parses the command (step 204). Once parsed, the query is optimized in step 206 by an optimizer. Next, the instructions for performing the requested query are executed (step 208) before the process 200 exits (step 210).

Figure 5:
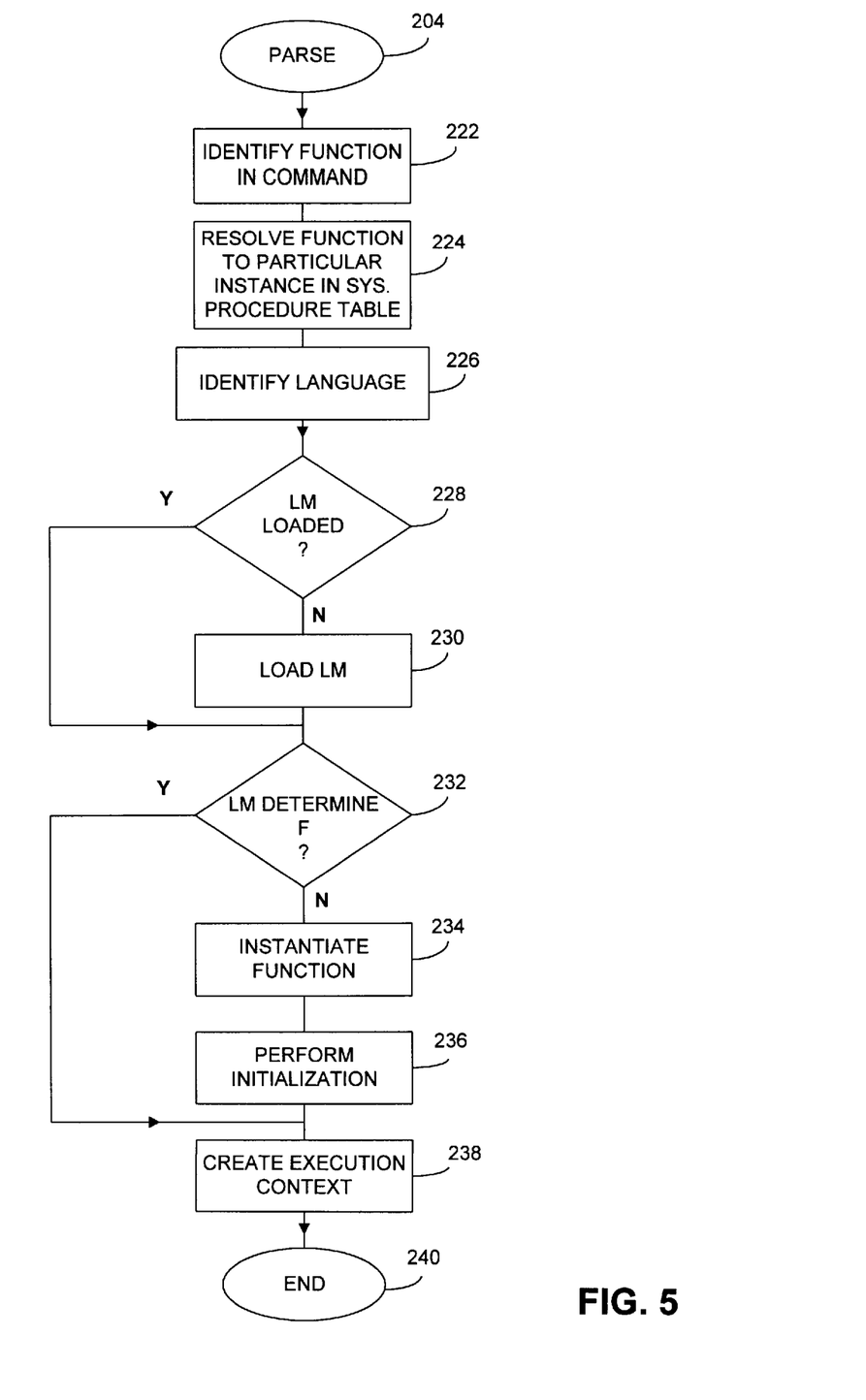
FIG. 5 is a flow chart illustrating a parse process.

Turning now to FIG. 5, the parse process 204 (FIG. 4) is shown in more detail. Initially, the process 204 identifies the function being invoked from an SQL command (step 222). Next, the process 204 resolves the function call to a particular instance using the SYS_PROCEDURE table of FIG. 3 (step 224). The parse process 204 then identifies the particular language being invoked (step 226). Next, the process 204 determines whether the desired language manager already has been loaded in memory (step 228). If not, the desired language manager is loaded (step 230). Alternatively, if the language manager has been loaded, the process 204 proceeds to step 232.

From step 228 or 230, the parse process 204 proceeds to step 232 where the language manager determines whether the invoked function already has been loaded into memory. If not, the process 204 instantiates the desired function (step 234) and performs specific function initialization as needed (step 236). From step 236 or step 232, in the event that the function being invoked already has been loaded, the routine 204 creates an execution context (step 238). Next, the parse function 204 exits (step 240).

Figure 6:
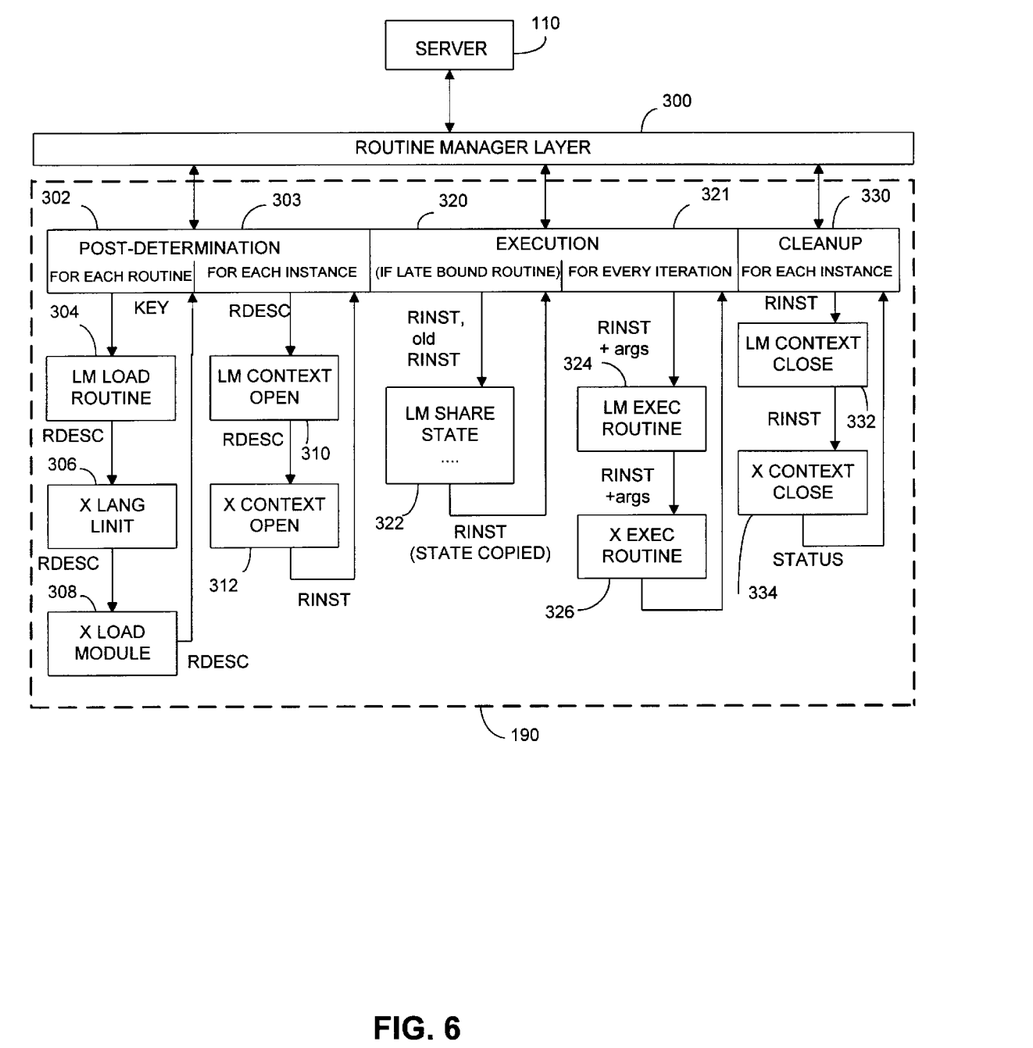
FIG. 6 is a schematic illustration of modules within a language manager and their interactions with a routine manager.

FIG. 6 illustrates details of interactions between the routine manager 188 and language managers 190–192. The managers 188, 190 and 192 interact via a plurality of middle layers, including a routine post-determination layer 302, an instance of the post-determination layer 303, a late bound execution layer 320, an iteration execution layer 321 and a cleanup layer 330. The interaction among the layers and managers is accomplished using data structures, as discussed below.

The Routine Descriptor (RDESC) structure is used by LM components in all sessions to save static information about a particular routine. The RDESC structure is allocated in system-wide shared memory and cached for reuse. The Routine Instance (RINST) structure describes the context of a routine sequence in an SQL statement. The RINST structure contains references to the routine's static, state, and dynamic data for each execution. Each routine invocation logically has a distinct RINST, but for efficiency, these structures may be cached and recycled between statements on a session wide basis.

The Language Descriptor (LDESC) structure is used to vector LM operations to the appropriate language functions. The LDESC structure is filled in by language specific code when the language is initialized and linked into the languages list by the Language Manager. The Module Descriptor (MDESC) structure is used to describe a single UDR module, each of which may contain many routines. The MDESC structure contains public information, including the name of the module, and private information used only by the module's language functions. The MDESC structure is filled in when the module is loaded and is linked into the module list by the Language Manager.

Turning now to the post-determination middle layers 302 and 303, for each routine, the post-determination layer 302 supplies a key to a language manager load routine 304, which in turn loads an RDESC structure. After the LM load routine 304 has been executed, the RDESC structure is passed into a language initialization module 306. After the RDESC data structure has been initialized, the RDESC structure is provided to a load module 308, after which the RDESC structure is fully initialized.

The initialized RDESC structure then is provided to the post-determination middle layer 303 where, for each instance, a language manager context open module 310 and a context open module 312 processes the routine descriptor RDESC structure. From the post-determination layer 303, the fully initialized RDESC structure is provided to the LM context open module 310, which in turn generates a RINST data structure. The RINST data structure is initialized at this stage before it is passed back to the post-determination layer 303. Upon completion of processing from the post-determination layer 303, the routine manager layer 300 provides the RDESC structure to an execution middle layer which further can be divided into a late-bound execution layer 320 and an iteration execution layer 321.

In the case of the late-bound execution layer 320, the routine instance data structure is provided to a language manager shared state module 322. The shared state module 322 copies state information into the RINST data structure. The updated RINST data structure is provided back to the late bound execution layer 320. Additionally, for each iteration, the routine instance RINST data structure as well as arguments are provided to an LM execution routine 324. The resulting RINST and outputs from the LM execution routine 324 are provided to an execution routine 326 which returns the output back to the iteration execution unit 321.

From the iteration execution unit 321, the routine manager layer 300 communicates with the cleanup layer 330 which, for each instance, provides the RINST data structure to an LM context close module 332 for deallocating memory and data storage associated with various data structures. The RINST data structure then is passed to a context close module 334 which provides status information back to the cleanup layer 330.

Figure 7:
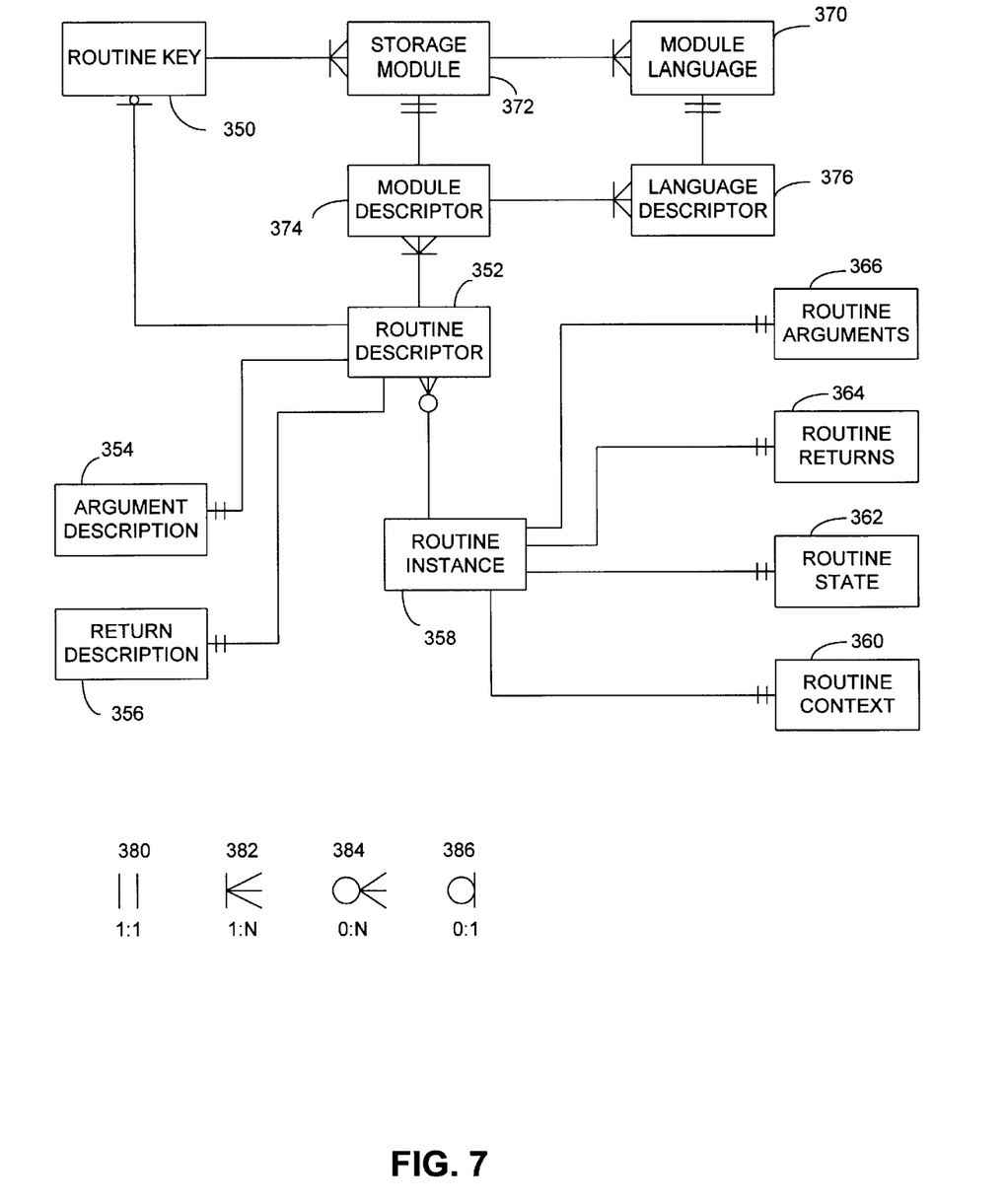
FIG. 7 is a UDR language manager entity relationship diagram.

Referring to FIG. 7, a UDR language manager entity relationship diagram is illustrated. In this diagram, four possible relationships 380–386 exist. The relationship 380, exemplified by two parallel lines, indicates a one-to-one relationship. The relationship 382, indicative of a one-to-many relationship, is illustrated by a line next to a left arrow. The relationship 384, indicative of a zero to many mapping, is shown as a circle next to a left arrow. Finally, a zero-to-one relationship of the relationship 386 is shown as a zero next to a vertical line. The UDR language manager entity relationship is discussed in the context of relationships 380–386.

In FIG. 7, a Storage Module 372 may contain one or more routines, each represented by a Routine Key 350. a Language Module 370 may reference one or more Storage Modules 372. Each Storage Module 372 has exactly one Module Descriptor 374, and each Language Module 370 has exactly one Language Descriptor 376. The Language Descriptor 376, in turn, has a Module Descriptor 374, which may be used by one or more languages. A Routine Descriptor 352 has one Module Descriptor 374. The Module Descriptor may be referenced by one or more Routine Descriptors 352. Each Routine Descriptors 352 contains one Argument Description 354 and one Return Description 356. A Routine Descriptor 352 may be contained in zero to many Routine Instances 358. Each Routine Instance contains one Routine Argument list 366, one Routine Returns list 364, one Routine State set 362, and one Routine Context 360, none of which are referenced by any other Routine Instance 358.

An exemplary C language interface, an instance of the General Language Interface that supplies the function calls, is described below.

```
STATUS udrlm_clang_init (                          Fills in the udrlm_1desc. The other functions in
    udrlm_1desc*) ;      //language descriptor     this section are entered into the structure for use
                                                   by the Language Manager. These functions are
                                                   statically linked into the CPU module so no loading
                                                   is necessary. Returns FUNCSUCC on success.
STATUS udrlm_clang_shut (                          a NOP because the C language udrlm_1desc structure
    udrlm_1desc*) ;      //language descriptor     is not to be cleared.
STATUS udrlm_clang_parse (                         Parses the module name from the given external_name
    char*,               //external_name from user string. The external_name argument is set to the
char*,                   //module_name             module name and the entry point portion of the
    char*) ;             //symbol_name             string is copied into the symbol_name argument. If
                                                   there is no module name, the string "CNULL" is
                                                   copied into module_name. If there is no entry point
                                                   string, the symbol_name argument is set to a null
                                                   string.
```

```
STATUS udrlm_clang_load_module (    Loads the routine descriptor and module descriptor
    udrlm_rdesc*,       //routine descriptor
    udrlm_mdesc*) ;     //module descriptor
```

Since the server language, in this case C, is the basis for the Language Manager itself, these functions are built-in to code on the server 110 rather than being loaded dynamically. Moreover, unlike other languages, the C language initialization function is called at system start-up, rather than at language loading time.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

What is claimed is:

1. A method, performed by a database server, for handling one or more User Defined Routines (UDRs) capable of being expressed in one or more languages, the method comprising:
   determining a language native to a UDR;
   checking whether a language manager associated with the determined native language already has been loaded and if not, loading the language manager into a server memory;
   checking whether the UDR already has been instantiated and if not, instantiating and initializing the UDR;
   creating an execution context for the UDR; and
   providing a Java language manager which communicates with a Java virtual machine using shared memory.

2. A method, performed by a database server, for handling one or more User Defined Routines (UDRs) capable of being expressed in one or more languages, the method comprising:
   determining a language native to a UDR by looking up a system catalog;
   checking whether a language manager associated with the determined native language already has been loaded and if not, loading the language manager into a server memory;
   checking whether the UDR already has been instantiated and if not, instantiating and initializing the UDR; and
   creating an execution context for the UDR.

3. A method, performed by a database server, for handling one or more User Defined Routines (UDRs) capable of being expressed in one or more languages, the method comprising:
   determining a language native to a UDR;
   checking whether a language manager associated with the determined native language already has been loaded and if not, loading the language manager into a server memory;
   checking whether the UDR already has been instantiated and if not, instantiating and initializing the UDR;
   creating an execution context for the UDR; and,
   creating and initializing a routine descriptor (RDESC) structure, a routine instance (RINST) structure, a language descriptor (LDESC) structure and a module descriptor structure (MDESC).

4. A method, performed by a database server, for handling one or more User Defined Routines (UDRs) capable of being expressed in one or more languages, the method comprising:

determining a language native to a UDR;

checking whether a language manager associated with the determined native language already has been loaded and if not, loading the language manager into a server memory;

checking whether the UDR already has been instantiated and if not, instantiating and initializing the UDR;

creating an execution context for the UDR; and, providing a general language interface capable of initializing the language manager, loading the language manager, creating a language manager context, and executing the language manager.

5. A computer system, comprising:

a processor;

a memory array coupled to said processor;

a display coupled to said processor;

a data storage device coupled to said processor for storing a database management system (DBMS) for handling one or more User Defined Routines (UDRs) capable of being expressed in one or more languages, and software residing on the memory array or the data storage device to perform the following operations:
determining a language native to the UDR;
checking whether a language manager associated with the native language already has been loaded and if not, loading the language manager into a server memory;
checking if the UDR has already been instantiated and if not, instantiating and initializing the UDR;
creating an execution context for the UDR; and
compiling and executing the UDR in a language-specific virtual machine.

6. The computer system of claim 5, wherein the language-specific virtual machine comprises a Java virtual machine.

7. A computer system, comprising:

a processor;

a memory array coupled to said processor;

a display coupled to said processor;

a data storage device coupled to said processor for storing a database management system (DBMS) for handling one or more User Defined Routines (UDRs) capable of being expressed in one or more languages;

software residing on the memory array or the data storage device to perform the following operations:
determining a language native to the UDR;
checking whether a language manager associated with the native language already has been loaded and if not, loading the language manager into a server memory;
checking if the UDR has already been instantiated and if not, instantiating and initializing the UDR;
creating an execution context for the UDR; and, a routine descriptor (RDESC) structure, a routine instance (RINST) structure, a language descriptor (LDESC) structure and a module descriptor structure (MDESC).

8. A computer system, comprising:

a processor;

a memory array coupled to said processor;

a display coupled to said processor;

a data storage device coupled to said processor for storing a database management system (DBMS) for handling one or more User Defined Routines (UDRs) capable of being expressed in one or more languages;

software residing on the memory array or the data storage device to perform the following operations:
determining a language native to the UDR;
checking whether a language manager associated with the native language already has been loaded and if not, loading the language manager into a server memory;
checking if the UDR has already been instantiated and if not, instantiating and initializing the UDR;
creating an execution context for the UDR; and,
a general language interface capable of initializing a language manager, loading the language manager, creating a language manager context, and executing the language manager.

9. Computer software for a DBMS, the software residing on a computer readable medium and comprising instructions for causing a computer to perform the following operations:
determining a language native to the UDR;
checking whether a language manager associated with the native language already has been loaded and if not, loading the language manager into a server memory;
checking if the UDR has already been instantiated and if not, instantiating and initializing the UDR;
creating an execution context for the UDR; and
looking up a system catalog in determining the language native to the UDR.

10. Computer software for a DBMS, the software residing on a computer readable medium and comprising instructions for causing a computer to perform the following operations:
determining a language native to the UDR;
checking whether a language manager associated with the native language already has been loaded and if not, loading the language manager into a server memory;
checking if the UDR has already been instantiated and if not, instantiating and initializing the UDR;
creating an execution context for the UDR; and,
creating and initializing instructions for a routine descriptor (RDESC) structure, a routine instance (RINST) structure, a language descriptor (LDESC) structure and a module descriptor structure (MDESC).

11. Computer software for a DBMS, the software residing on a computer readable medium and comprising instructions for causing a computer to perform the following operations:
determining a language native to the UDR;
checking whether a language manager associated with the native language already has been loaded and if not, loading the language manager into a server memory and providing a general language interface capable of initializing the language manager, loading the language manager, creating a language manager context, and executing the language manager;
checking if the UDR has already been instantiated and if not, instantiating and initializing the UDR; and
creating an execution context for the UDR.

12. Computer software for a DBMS, the software residing on a computer readable medium and comprising instructions for causing a computer to perform the following operations:
determining a language native to the UDR;
checking whether a language manager associated with the native language already has been loaded and if not, loading the language manager into a server memory;
checking if the UDR has already been instantiated and if not, instantiating and initializing the UDR;
creating an execution context for the UDR; and
executing the UDR in a variety of languages using a routine manager.

* * * * *